US012626206B2

(12) United States Patent
Sheppard et al.

(10) Patent No.: US 12,626,206 B2

(45) Date of Patent: *May 12, 2026

(54) DETERMINING RELATIVE RISK IN A NETWORK SYSTEM

(71) Applicant: Truist Bank, Charlotte, NC (US)

(72) Inventors: Jason C. Sheppard, Wilson, NC (US); Jennifer Dick, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 443 days.

This patent is subject to a terminal disclaimer.

(21) Appl. No.: 17/847,514

(22) Filed: Jun. 23, 2022

(65) Prior Publication Data

US 2022/0351100 A1 Nov. 3, 2022

Related U.S. Application Data

(63) Continuation-in-part of application No. 17/730,300, filed on Apr. 27, 2022, now abandoned.

(60) Provisional application No. 63/182,220, filed on Apr. 30, 2021.

(51) Int. Cl.
G06Q 10/0635 (2023.01)

(52) U.S. Cl.
CPC ................................ G06Q 10/0635 (2013.01)

(58) Field of Classification Search
CPC ... G06Q 10/0635; G06Q 10/06; G06F 21/577
See application file for complete search history.

(56) References Cited

U.S. PATENT DOCUMENTS

| | | | | |
|---|---|---|---|---|
| 2010/0199352 A1* | 8/2010 | Hill | ...................... | G06F 21/577 726/25 |
| 2015/0227868 A1* | 8/2015 | Saraf | .................. | G06Q 10/0635 705/7.28 |
| 2020/0004968 A1* | 1/2020 | Brannon | ............... | G06F 21/577 |

FOREIGN PATENT DOCUMENTS

| | | | | |
|---|---|---|---|---|
| EP | 2575102 A1 * | 4/2013 | ............. | G06Q 40/06 |

OTHER PUBLICATIONS

Priyanka Chandani, Requirement Risk Prioritization using Analytic Hierarchy Process: A Gateway to Identify Risky Requirements, Eleventh International Conference on Contemporary Computing (IC3), Aug. 2-4, 2018, Noida, India (Year: 2018).*

(Continued)

*Primary Examiner* — Jerry O'Connor
*Assistant Examiner* — Matthew H Divelbiss
(74) *Attorney, Agent, or Firm* — Kilpatrick Townsend & Stockton LLP; Michael A. Springs, Esq.

(57) ABSTRACT

Relative risk in a network system can be determined according to some examples. For example, a computing system can determine a hierarchy of groupings for risk factors within a network based on risk data associated with the risk factors. The computing system can determine associations between the risk data and the risk controls. Each risk control can represent an amount of control for reducing riskiness of a risk factor. The computing system can determine a risk assessment for each grouping of the hierarchy of groupings based on the risk data, the risk controls, and the hierarchy of groupings. Determining the risk assessment can include determining a control coverage for each grouping based on the associations and the risk data. The computing system can output the risk assessment for each grouping of the hierarchy of groupings for display on a graphical user interface.

17 Claims, 7 Drawing Sheets

(56) References Cited

OTHER PUBLICATIONS

Non-Final Office Action, U.S. Appl. No. 17/730,300, Dec. 29, 2023, 29 pages.
Final Office Action, U.S. Appl. No. 17/730,300, May 7, 2024, 36 pages.

* cited by examiner

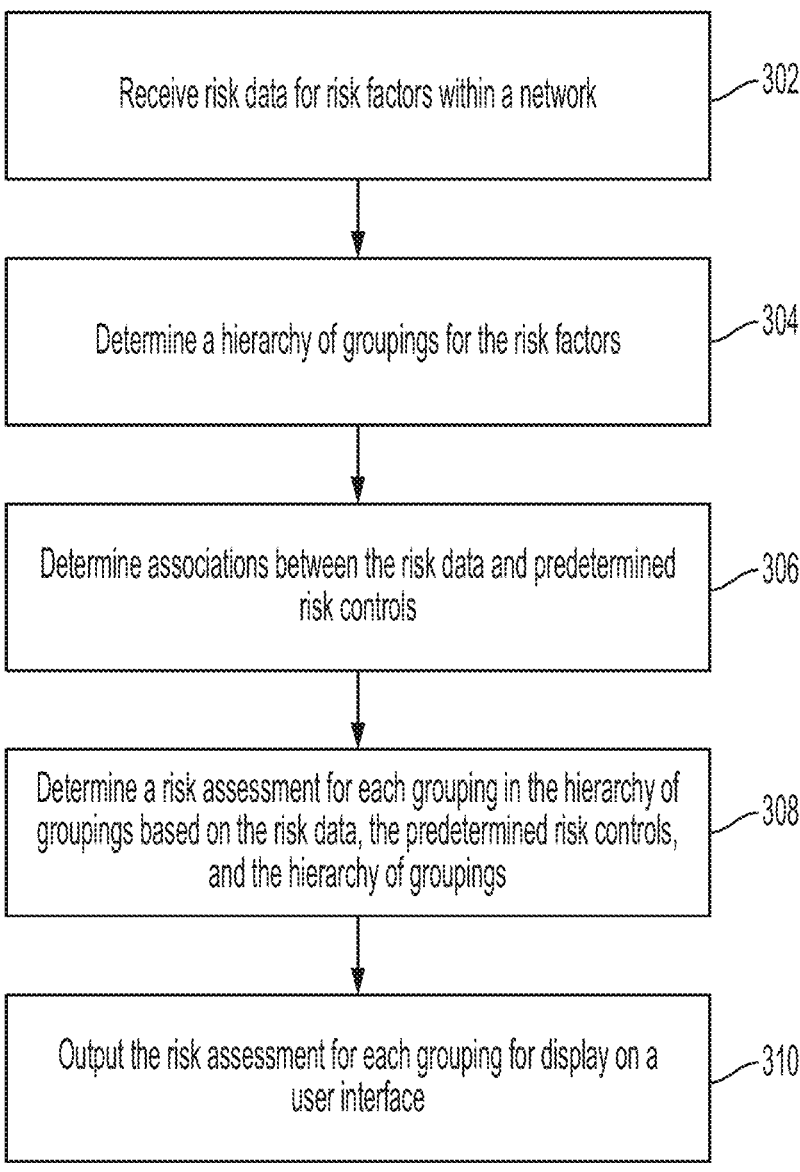

Receive risk data for risk factors within a network — 302

Determine a hierarchy of groupings for the risk factors — 304

Determine associations between the risk data and predetermined risk controls — 306

Determine a risk assessment for each grouping in the hierarchy of groupings based on the risk data, the predetermined risk controls, and the hierarchy of groupings — 308

Output the risk assessment for each grouping for display on a user interface — 310

FIG. 3

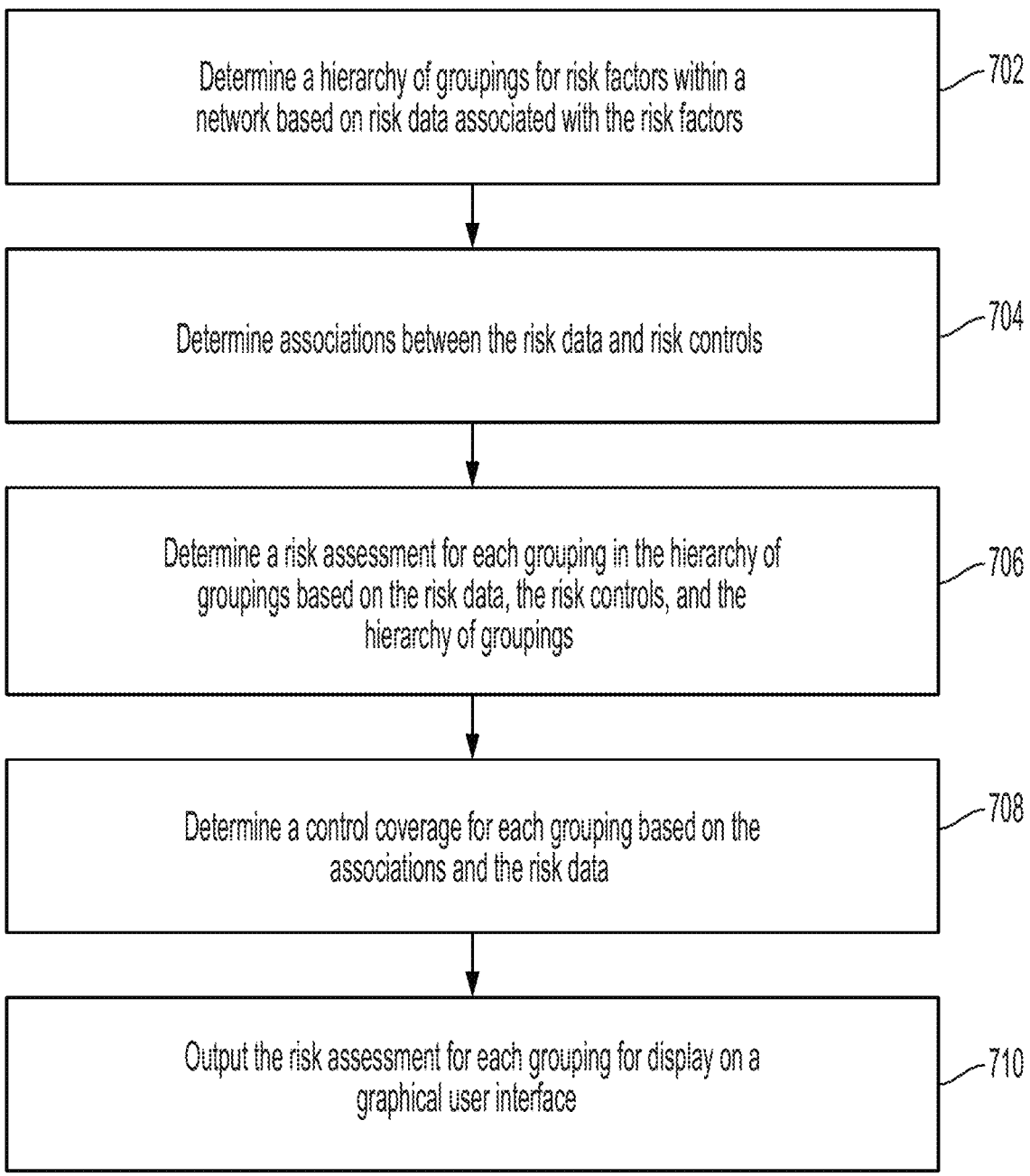

Determine a hierarchy of groupings for risk factors within a network based on risk data associated with the risk factors ⟋702

Determine associations between the risk data and risk controls ⟋704

Determine a risk assessment for each grouping in the hierarchy of groupings based on the risk data, the risk controls, and the hierarchy of groupings ⟋706

Determine a control coverage for each grouping based on the associations and the risk data ⟋708

Output the risk assessment for each grouping for display on a graphical user interface ⟋710

FIG. 7

DETERMINING RELATIVE RISK IN A NETWORK SYSTEM

CROSS-REFERENCE TO RELATED APPLICATION

This is a continuation-in-part of, and claims priority to, U.S. Non-Provisional application Ser. No. 17/730,300, filed Apr. 27, 2022 and titled "Determining Relative Risk In A Network System," which claims priority to U.S. Provisional Application Ser. No. 63/182,220, filed Apr. 30, 2021 and titled "Determining Risk in a Network System for Technology Analytics," the entirety of each of which is incorporated herein by reference.

TECHNICAL FIELD

The present disclosure relates network systems and, more particularly (although not necessarily exclusively), to determining relative risk in network systems.

BACKGROUND

Separate data systems in a network can include different types of data in different formats. Integrating data from separate systems may be an involved process that takes a significant amount of time, requires significant computing power, and is often a technically challenging process. Even data in the separate systems that is the same type may be in different formats or represented differently. When two entities, even entities that focus on the same thing, combine in some manner, often the data in the separate systems of the entities can be in different formats.

SUMMARY

One example of the present disclosure includes a system comprising a processor and a non-transitory computer-readable memory. The non-transitory computer-readable memory can include instructions that are executable by the processor for causing the processor to perform operations. The operations can include determining a hierarchy of groupings for a plurality of risk factors within a network based on a plurality of risk data associated with the plurality of risk factors. The operations can include determining a plurality of associations between the plurality of risk data and a plurality of risk controls, each risk control of the plurality of risk controls representing an amount of control for reducing riskiness of a risk factor of the plurality of risk factors. The operations can include determining a risk assessment for each grouping of the hierarchy of groupings based on the plurality of risk data, the plurality of risk controls, and the hierarchy of groupings. Determining the risk assessment can include determining, based on the plurality of associations and the risk data, a control coverage for the grouping. The operations can include outputting the risk assessment for each grouping of the hierarchy of groupings for display on a graphical user interface.

Another example of the present disclosure can include a method. The method can involve determining, by a processor, a hierarchy of groupings for a plurality of risk factors within a network based on a plurality of risk data associated with the plurality of risk factors. The method can include determining, by the processor, a plurality of associations between the plurality of risk data and a plurality of risk controls, each risk control of the plurality of risk controls representing an amount of control for reducing riskiness of a risk factor of the plurality of risk factors. The method can include determining, by the processor, a risk assessment for each grouping of the hierarchy of groupings based on the plurality of risk data, the plurality of risk controls, and the hierarchy of groupings. Determining the risk assessment can include determining, by the processor and based on the plurality of associations and the risk data, a control coverage for the grouping. The method can include outputting, by the processor, the risk assessment for each grouping of the hierarchy of groupings for display on a graphical user interface.

Still another example of the present disclosure can include a non-transitory computer-readable medium comprising program code that is executable by a processor for causing the processor to perform operations. The operations can include determining a hierarchy of groupings for a plurality of risk factors within a network based on a plurality of risk data associated with the plurality of risk factors. The operations can include determining a plurality of associations between the plurality of risk data and a plurality of risk controls, each risk control of the plurality of risk controls representing an amount of control for reducing riskiness of a risk factor of the plurality of risk factors. The operations can include determining a risk assessment for each grouping of the hierarchy of groupings based on the plurality of risk data, the plurality of risk controls, and the hierarchy of groupings. Determining the risk assessment can include determining, based on the plurality of associations and the risk data, a control coverage for the grouping. The operations can include outputting the risk assessment for each grouping of the hierarchy of groupings for display on a graphical user interface.

BRIEF DESCRIPTION OF THE DRAWINGS

FIG. 3 is a flowchart of a process for determining risk assessments for a network system according to one aspect of the present disclosure.

FIG. 7 is a flowchart of a process for determining prioritization of risk controls for a network system according to one aspect of the present disclosure.

DETAILED DESCRIPTION

Figure 1:
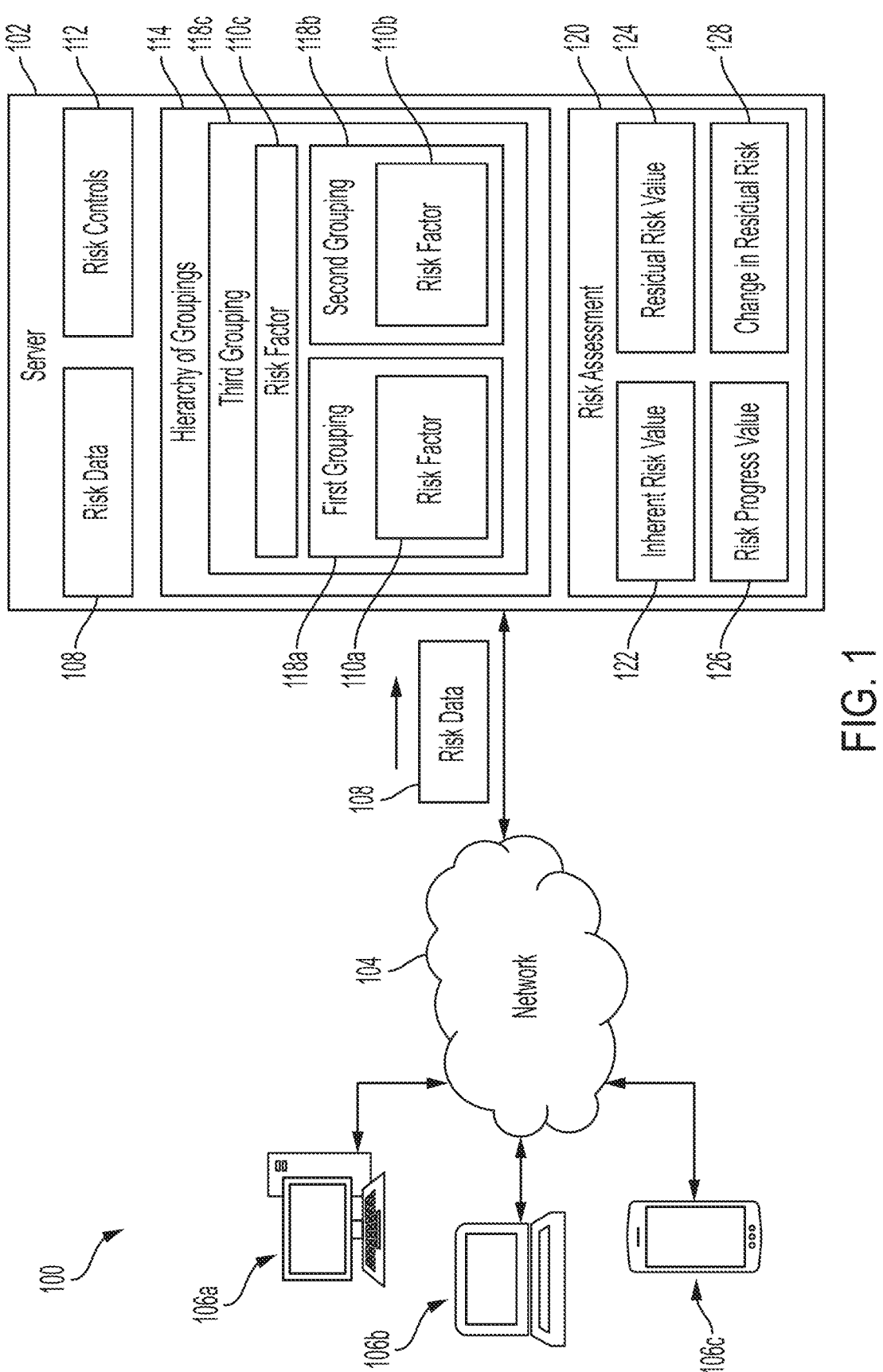
FIG. 1 is a schematic of an example of a network system for determining risk assessments according to one aspect of the present disclosure.

Certain aspects and features relate to determining relative risk relating to risk factors in connection with risk management capabilities in a network system that includes multiple, distributed devices and subsystems. A risk factor can be any process, product, vulnerability, or event that may have a negative impact on an organization or system. The network system can determine relative risk for various risk factors based on risk data by organizing the risk data into a hierarchy of groupings. Each risk factor may have an associated risk management capability, also referred to herein as a risk control. A risk control may be a potential amount of control over reducing the riskiness of the risk factor. Based on the risk data, risk controls, and hierarchy, risk assessments for each risk factor and each grouping within the hierarchy as well as a total risk assessment can be determined.

It may be challenging to analyze large amounts of risk data from internal or external sources. The relative risk of various risk factors may be unclear, as risk data for various risk factors may be scaled differently or may have varying levels of detail. It may also be challenging to monitor changes in risk levels over time, or to determine what can be done to mitigate specific risk factors. This may cause difficulties in relating such risk data effectively and appropriately together such that a comprehensive, but understandable, view of the relative risk for a network system of an organization can be achieved.

To address some or all of the abovementioned problems, risk assessments for the network system can be determined by aggregating multiple risk factors into a hierarchy according to their attributes. For example, risk factors related into investments can be aggregated into a hierarchy comprised of multiple levels of interrelated groups. The highest level of the hierarchy can be a group including all investment risks. The next level of the hierarchy can divide the highest level into two groups: a laptop investment group and a television investment group. The lowest level of the hierarchy can include groupings that each include one or more risk factors associated with investing in specific laptop or television products. Aggregating the risk factors into risk groups in a hierarchy can relate the risk factors together. Additionally, risk assessments can be determined using risk data collected for some or all risk factors or levels in the hierarchy. For example, a risk assessment can be performed using risk data associated with a specific laptop product investment risk, or for the entire investment risk group using risk data associated with the risks belonging to the entire investment risk group. A risk assessment can include an assessment of the relative risk of the risk factor as compared to other risk factors, level of control over the risk factor, and an increase or decrease of relative risk for the risk factor over time. Risk assessments may output to be displayed on a user interface for use in reducing risk for the network system. Determining risk assessments in such a way may require less computing power than separately analyzing individual risk factors.

In some examples, relative risk can be determined based in part on risk controls for an organization, and such relative risk can be modeled and displayed using risk data associated with the risk controls. Relative risk can be a measure of risk scaled from 0 to 1, where 0 indicates a low level of risk and 1 indicates a high level of risk. Risk data can be a metric for quantifying an amount of risk for a particular risk factor. For example, an organization may collect risk data associated with a risk factor of property theft. A risk control can include hiring a security guard or implementing a security camera system to mitigate the property theft risk factor. The relative risk of property theft can be determined by assessing its underlying individual risk factors, and can be structured in a hierarchy to decompose its various individual risk factors. For example, the risk factor of property theft can include individual risk factors of physical property theft and intellectual property theft. The physical property theft risk factor and intellectual property theft risk factor can be aggregated under a property theft risk factor grouping in a hierarchy. A risk assessment can be performed for both the physical property theft risk factor and the intellectual property theft risk factor using risk data associated with each risk factor. Additionally, another risk assessment can be performed for the grouping of property theft using the previously determined risk assessments.

In some examples, a risk control can prevent, detect, mitigate, or correct the effects of a risk factor. Some examples of risk controls can include reducing the likelihood of a risk factor occurring or reducing the impact of a risk factor to the network system. A risk control may have a value that is a metric defining the amount of control a system or organization has in affecting the level of relative risk for a particular risk factor. The predetermined control value can indicate the amount of risk that can potentially be mitigated. In some examples, a risk control can range from 0 (indicating no control) to 1 (indicating complete control). For example, the risk control for a network system's cyber security attack risk factor may be high depending on security measures implemented by the network system, but may not be 1 due to the impossibility of preventing every possible cyber security attack.

In some examples, the risk assessments can include determining various risk calculations. For example, the risk assessment can include calculating an inherent risk value and a residual risk value for a particular risk factor or grouping in the hierarchy, along with a risk progress level for the network system. The inherent risk value can be the level of risk of the risk data, before any risk controls are applied to the risk factor. In some examples, the inherent risk value can range from 0 (indicating a low level of risk) and 1 (indicating a high level of risk). The residual risk value can be an estimate of a potential level of risk after a risk control is applied to a risk factor. The residual risk value can represent the amount of risk that cannot be controlled, according to the effectiveness of the risk control. In some examples, the residual risk value can range from 0 (indicating a small amount of remaining risk) to 1 (indicating a large amount of remaining risk). The risk progress value can be determined by comparing the residual risk value with an acceptable risk level. The acceptable risk level can be predetermined and can represent an acceptable level of relative risk for a particular risk factor. In some examples, the risk assessment can additionally include changes in the residual risk value and the risk progress value over time.

In some examples, the risk assessment can include determining an amount of control coverage for each risk factor or groupings of risk factors. For example, each risk factor can have a number of associated risk controls. In some examples, a risk factor may have little to no associated risk controls, or may have associated risk controls with low control strength values. Such risk factors may have low control coverage. Risk factors with low control coverage can be likely to have a large residual risk value. Therefore, the risk assessment can include identifying risk factors with low control coverage. Risk controls associated with the risk factors with low control coverage can be identified as needing improvement.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

FIG. 1 is a schematic of an example of a network system 100 for determining risk assessments 120 according to one aspect of the present disclosure. Included in the network system 100 are server 102, one or more networks 104, and user devices 106*a-c*. The user devices 106*a-c* can transmit risk data 108 relating to various risk factors 110 for the network system 100 to the server 102 via the network 104. Examples of user devices 106*a-c* can include desktop computers, laptop computers, smart watches, and cell phones. The user devices 106*a-c* can be network devices belonging to an organization for the network system 100.

The server 102 may be or include any type of server including, for example, a rack server, a tower server, an ultra-dense server, a super server, or the like. The server 102 may include various hardware components such as, for example, a motherboard, processing units, memory systems, hard drives, network interfaces, power supplies, etc. The server 102 may include one or more server farms, clusters, or any other appropriate arrangement or combination of computer servers. Additionally, the server 102 may act according to stored instructions located in a memory subsystem of the server 102 and may execute an operating system or other applications. In some examples, the server 102 may be a cloud-hosted system that exists on a serverless, cloud-based environment.

The server 102 may include risk factors 110*a-c* and risk controls 112. For example, risk factors 110*a-c* can include information security, cyber security, data management, financial management, or information technology strategy. Each risk factor 110 may have one or more associated risk controls 112, which can be a measure of an amount of control for reducing riskiness of the associated risk factor 110. For example, a risk control 112 for an information security risk factor 110 can include requiring two-factor authentication to access the network system 100. The server 102 may arrange the risk factors 110*a-c* into a hierarchy of groupings 114. The hierarchy of groupings 114 may relate the risk factors 110*a-c* together into different levels. In one example, the hierarchy of groupings 114 can include a first level including a first grouping 118*a* and a second grouping 118*b*. The first grouping 118*a* can include one or more risk factors 110*a*. The second grouping 118*b* can include one or more risk factors 110*b*. An additional level in the hierarchy 114 can include a third grouping 118*c*. The third grouping 118*c* may include the first grouping 118*a* and the second grouping 118*b*. The third grouping 118*c* may be a broader category that describes both the first grouping 118*a* and the second grouping 118*b*. In some examples, the third grouping 118*c* may include an additional risk factor 110*c*.

After receiving the risk data 108 from the user devices 106*a-c*, the server 102 may determine associations between the risk data 108 and the risk controls 112. For example, the server 102 may determine which risk data 108 applies to which risk factor 110, and may determine associations between the risk data 108 and the risk controls 112 based on predetermined associations between risk factors 110 and risk controls 112. The server 102 may determine a risk assessment 120 for each grouping 118 of the hierarchy of groupings 114 based on the risk data 108, the risk controls 112, and the hierarchy of groupings 114. For example, risk controls 112 can be applied to the risk data 108 for each risk factor 110 in each grouping 118 in the lowest level of the hierarchy 114 to generate a risk assessment 120 for the grouping 118. A first risk assessment 120 can be determined for the first risk factor 110*a* in the first grouping 118*a*, and a second risk assessment 120 can be determined for the second risk factor 110*b* in the second grouping 118*b*. Then, the first risk assessment 120 and the second risk assessment can be used to determine risk assessments for higher levels or groupings within the hierarchy of groupings 114. For example, a third risk assessment 120 for the third grouping 118*c* can be determined based on the first risk assessment 120 and the second risk assessment 120. Additionally, the third risk assessment 120 can be determined by applying a risk control to the third risk factor 110*c* in the third grouping 118*c*. The risk assessment 120 for each succeeding level of the hierarchy of groupings can be determined, at least in part, by the risk assessments determined for the lower levels. The risk assessment 120 determined for the highest level of the hierarchy of groupings 114, such as the third grouping 118*c* depicted in FIG. 1, can be a total risk assessment 120 for the hierarchy of groupings 114.

A risk assessment 120 can include various measures of riskiness based on the risk data 108 and risk controls 112. For example, the risk assessment 120 can include inherent risk values 122, residual risk values 124, risk progress values 126, and changes in residual risk 128. The inherent risk value 122 can be a measure of the riskiness of a particular risk factor 110 based on the risk data 108 alone, if no risk controls 112 are applied to the particular risk factor 110. The residual risk value 124 can be an estimation of the riskiness of the particular risk factor 110 after risk controls 112 are applied to the particular risk factor 110. For example, a risk factor 110 of network security can have an inherent risk value 122 reflecting risk associated with the security of a network before any security measures are applied. Risk controls 112 for the risk factor 110 can include the various security measures, such as encryption and user authentication. The residual risk value 124 may be a measure of the potential risk to the security of the network after the various security measures are implemented.

In some examples, multiple risk controls 112 may be associated with a risk factor 110. The server 102 may determine the residual risk value 124 by applying the risk control 112 with the highest control strength to the risk factor 110. Alternatively, the server 102 may determine the residual risk value 124 by applying all risk controls 112 that are associated with the risk factor 110 to the risk factor 110 to generate the residual risk value 124. For example, the risk assessment 120 may include a control coverage value. The control coverage value can be a proportion of the inherent risk value 122 that is covered by the risk controls 112 associated with a particular risk factor 110 or grouping 118 of risk factors. For example, the server 102 can identify a set of risk controls associated with the third risk factor 110*c*. The server 102 can determine a control strength value for the set of risk controls. The server 102 can then compare the control strength value to the inherent risk value 122 for the third risk factor 110*c* to determine the control coverage value.

If the control coverage value is relatively low, such as below a predetermined threshold value, the server 102 may generate a recommendation to increase the number of risk controls for the third risk factor 110*c*. Increasing the number of risk controls for the third risk factor 110*c* may increase the control coverage value. Additionally or alternatively, the server 102 may generate a recommendation to increase the control strength values of the risk controls in the set of risk controls to increase the control coverage value. In some examples, the server 102 may identify particular risk controls to prioritize for reduction of the residual risk value 124. Some risk controls in the set of risk controls may have associated findings. The findings can indicate that measures to improve the control strength of the risk control are being implemented. The server 102 may determine that risk controls without associated findings can be prioritized, and can generate a recommendation to increase the control strength of such risk controls. The server 102 can output the control coverage value and the recommendation as part of a user interface for displaying the risk assessment 120.

In some examples, the server 102 may include a predetermined acceptable risk level that represents an acceptable level of risk to the network system 100. Determining the risk assessment 120 may include determining the risk progress value 126, which can be determined by comparing the residual risk value 124 to the predetermined acceptable risk level. It may be beneficial for the residual risk value 124 to match the risk progress value 126. Additionally, determining the risk assessment 120 may include determining the change in residual risk 128 over time. After determining the risk assessments 120 for one or more groupings 118 in the hierarchy of groupings 114, the server 102 may output the risk assessments 120 for display on a user interface. For example, the server 102 may output the risk assessments 120 for display on user interfaces of the user devices 106*a-c*. The displayed risk assessments 120 may be used to mitigate risk for the network system 100.

Although certain components are shown in FIG. 1, other suitable, compatible, network hardware components and network architecture designs may be implemented in various embodiments to support communication between the user devices 106*a-c* and the server 102. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the user devices 106*a-c* and server 102 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
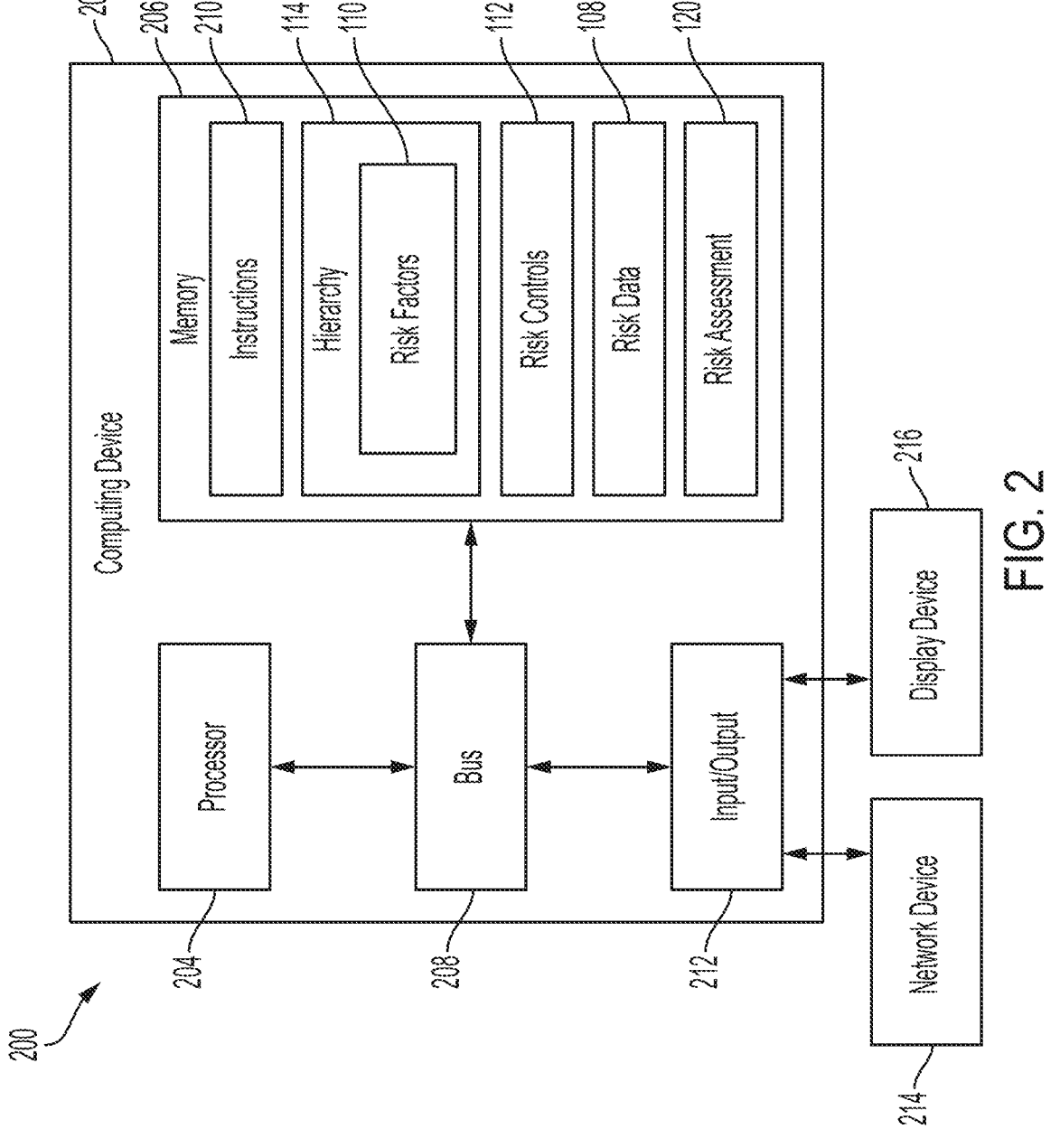
FIG. 2 is a block diagram of an example of a computing environment for determining risk assessments for a network system according to one aspect of the present disclosure.

FIG. 2 is a block diagram of an example of a computing environment 200 for determining risk assessments 222 for a network system according to one aspect of the present disclosure. The computing device 202 can include a processor 204, a memory 206, a bus 208, and an input/output 212. A display device 216 and network device 214 can be connected to the input/output 212. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 204 may execute one or more operations for implementing various examples and embodiments described herein. The processor 204 can execute instructions 210 stored in the memory 206 to perform the operations. The processor 204 can include one processing device or multiple processing devices. Non-limiting examples of the processor

204 include a Field-Programmable Gate Array ("FPGA"), an application-specific integrated circuit ("ASIC"), a microprocessor, etc.

The processor 204 may be communicatively coupled to the memory 206 via the bus 208. The non-volatile memory 206 may include any type of memory device that retains stored information when powered off. Non-limiting examples of the memory 206 include electrically erasable and programmable read-only memory ("EEPROM"), flash memory, or any other type of non-volatile memory. In some examples, at least some of the memory 206 may include a medium from which the processor 204 can read instructions 210. A computer-readable medium may include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions 210. The instructions 210 may include processor-specific instructions generated by a compiler or an interpreter from code written in any suitable computer-programming language, including, for example, C, C++, C#, etc.

The input/output 212 may interface other network devices or network-capable devices to analyze and receive information related to risk data 224. Information received from the input/output may be sent to the memory 206 via the bus 208. The memory 206 can store any information received from the input/output 212.

The memory 206 may include program code for receiving risk data 108 from the network device 214 related to risk factors 110 for a network system 100. The program code may cause the computing device 202 to determine a hierarchy 114 of the risk factors 110. The memory 206 may additionally include program code for causing the computing device 202 to associate the risk data 108 with predetermined risk controls 112, and to determine a risk assessment 120 for each grouping within the hierarchy 114 based on the risk data 108, the risk controls 112, and the hierarchy 114. The program code can additionally cause the computing device 202 to output the risk assessment 120 to the display device 216 via the input/output 212.

Figure 4:
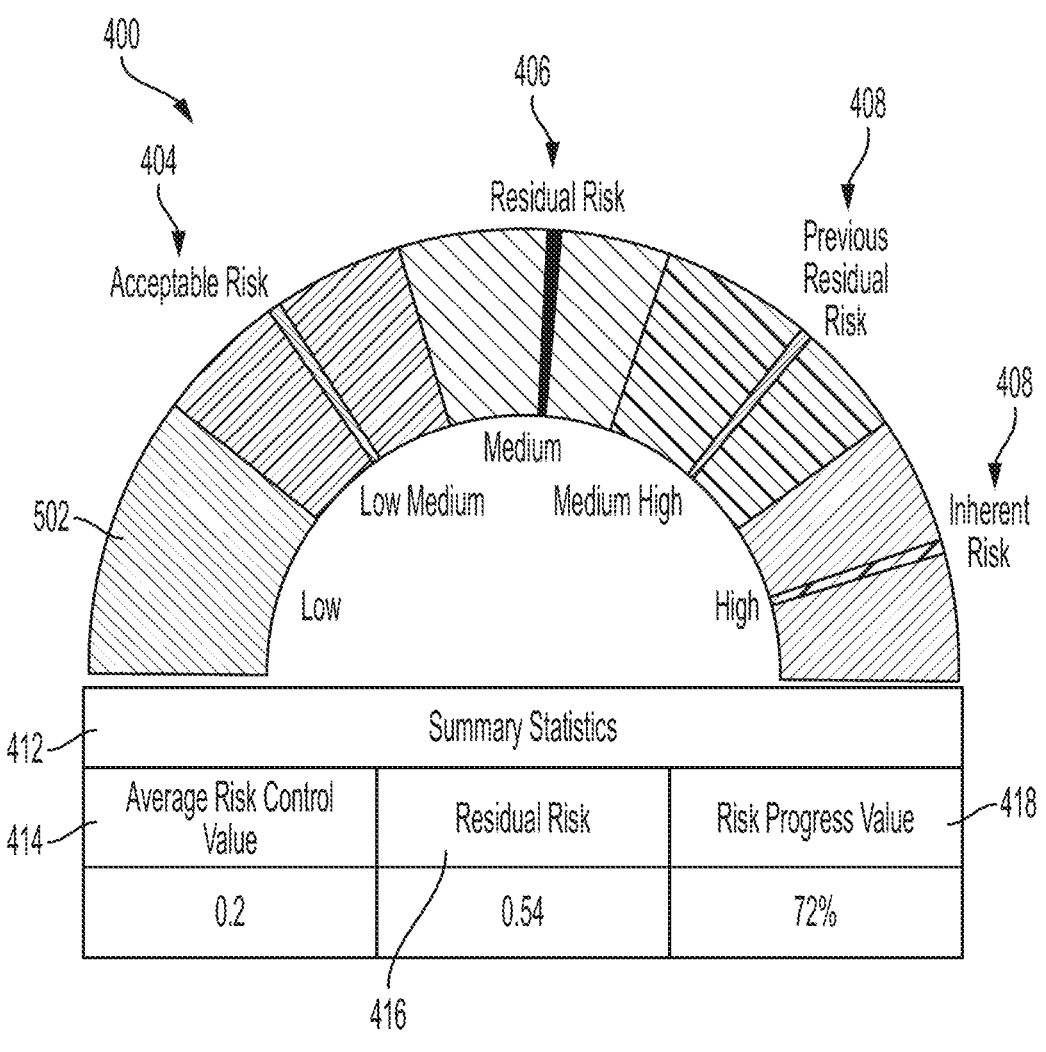
FIG. 4 is an example of a user interface used for displaying risk assessments for a network system according to one aspect of the present disclosure.
Figure 5:
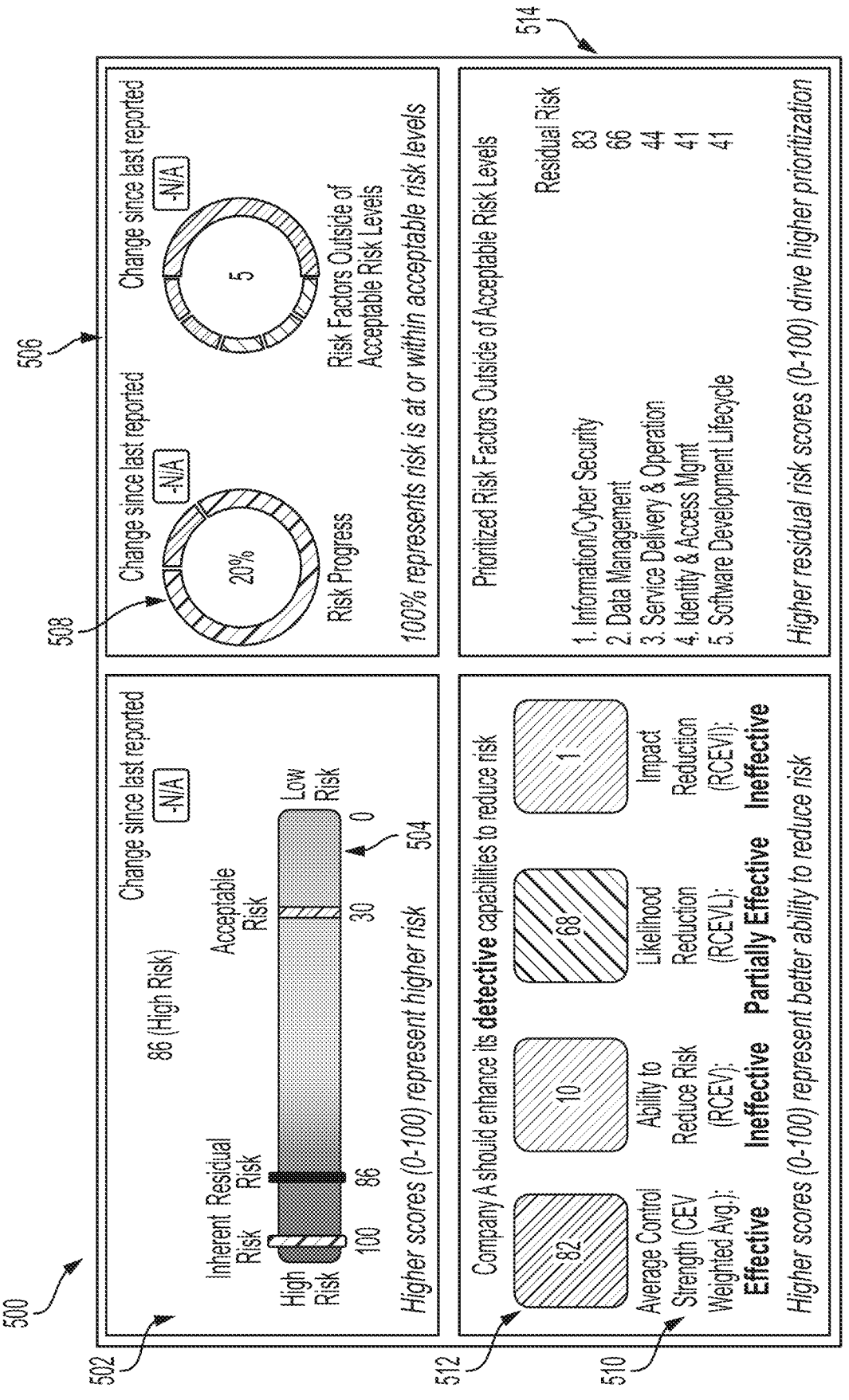
FIG. 5 is another example of a user interface used for displaying risk assessments for a network system according to one aspect of the present disclosure.

In some examples, the processor 204 can implement some or all of the steps shown in FIG. 3. Other examples may involve more steps, fewer steps, different steps, or a different order of the steps than is shown in FIG. 3. The steps of FIG. 3 are described below with reference to components described above with regard to FIGS. 1-2. Additionally, the components of FIGS. 4-5 are described with reference to the components and steps of FIGS. 1-3.

At block 302, the processor 204 receives risk data 108 for risk factors 110*a-b* within a network system 100 from one or more user devices 106*a-c*. The risk data 108 can comprise risk data for one or more types of risk factors 110*a-b* for an organization that includes the one or more user devices 106*a-c*. The risk data 108 can include one or more values representing an amount of relative risk for one or more risk factors 110 for the network system 100. In some examples, the processor 204 may determine which risk data 108 relates to which risk factors 110. In one particular example, the risk data 108 can be metrics of riskiness for the risk factors 110 of "Damage to Physical Assets Risk," "Business Continuity and Disaster Recovery Risk," and "Operational Risk."

At block 304, the processor 204 determines a hierarchy of groupings 114 for the risk factors 110. For example, the lowest level of the hierarchy 114 may include at least the "Damage to Physical Assets Risk." The next highest level of the hierarchy 114 may be the "Business Continuity and Disaster Recovery Risk," which may include the "Damage to Physical Assets Risk" and any other risk factors 110 on the lowest level. The highest level of the hierarchy 114 may be the "Operational Risk," which may include the "Business Continuity and Disaster Recovery Risk" and any other risk factors 110 on the preceding level.

At block 306, the processor 204 can determine associations between the risk data 108 and predetermined risk controls 112. Each predetermined risk control 112 can represent an amount of control for reducing riskiness of a risk factor 110. In some examples, the risk data 108 may include the predetermined risk controls 112. In other examples, the processor 204 may determine the associations by first determining associations between the risk data 108 and the risk factors 110. The processor 204 may then determine associations between the risk data 108 and the predetermined risk controls 112 by applying predetermined associations between the risk factors 110 and the predetermined risk controls 112.

At block 308, the processor 204 can determine a risk assessment 120 for each grouping 118 of the hierarchy of groupings 114. In some examples, risk assessments 120 for groupings 118 may at least in part be determined based on risk assessments determined for groupings 118 in lower levels of the hierarchy 114. In one example, determining the risk assessment 120 for the "Damage to Physical Assets Risk" can include determining an inherent risk value 122 based on the risk data 108 and determining a residual risk value 124 by applying the risk control 112 to the inherent risk value 122. For example, the residual risk value 124 can be scored by reducing the inherent risk value 122 by the risk control 112. The risk assessment 120 can further include a risk progress value 126 for the "Damage to Physical Assets Risk" determined by comparing the residual risk value 124 to a predetermined acceptable risk level. In some examples, the risk assessment 120 can include a tracking of the change in residual risk 128 over time.

A risk assessment 120 for the "Business Continuity and Disaster Recovery Risk" grouping 118 can then be determined based on the risk assessment 120 for the "Damage to Physical Assets Risk." For example, the risk assessment 120 for the "Business Continuity and Disaster Recovery Risk" can include an inherent risk value 122, a residual risk value 124, a risk progress value 126, and a change in residual risk 128 determined at least in part based on the inherent risk value 122, the residual risk value 124, the risk progress value 126, and the change in residual risk 128 determined for the "Damage to Physical Assets Risk." The risk assessment 120 for the "Operation Risk" grouping 118 can then be determined based on the risk assessment 120 for the "Business Continuity and Disaster Recovery Risk" in the same manner. The processor 204 may continue to determine risk assessments 120 for higher levels of the hierarchy 114 until risk assessments 120 for the entire hierarchy 114 have been performed.

At block 310, the processor 204 can output the risk assessment 120 for each grouping 118 of the hierarchy of groupings 114 for display on a user interface, such as on a display device 216 of the user devices 106a-c. For example, the processor 204 may cause tables, range diagrams such as dial plots, histograms, pie charts, and any other types of tables or charts to display the risk assessments 120 and its components. The displayed risk assessments 120 may be used to mitigate or reduce risks for the network system 100.

For example, the risk assessments 120 may be used to determine that current security measures to protect the network system 100 may be insufficient, and additional security measures may be required to reach the target risk progress value 126.

FIG. 4 is an example of a user interface 400 used for displaying risk assessments 120 for a network system 100 according to one aspect of the present disclosure. The user interface 300 can include a dial plot 402 and a table of summary statistics 412. The dial plot 402 can be a half circle with a shading gradient. The dial plot 402 can include five sections, from left to right: low, low medium, medium, medium high, and high. These sections can indicate an amount of risk, such as for a single risk factor 110, a grouping 118, or for all risk factors 110 in a hierarchy of groupings 114. In one example, the dial plot 402 can display a risk analysis for a "Technology Risk" risk factor 110 that includes an acceptable risk level 404 of "low medium", a residual risk value 406 of "medium," a prior residual risk value 408 from prior risk data 108 of "medium high," and an inherent risk value 410 of "high."

The table of summary statistics 412 can include columns detailing risk assessment 120 calculations. In the same example introduced in the preceding paragraph, the table of summary statistic 412 for the risk factor of "Technology Risk" can include an "average risk control value" 414 of 0.2, a "residual risk value" 416 of 0.54, and a "risk progress value" 418 of 72%. In this example, the table of summary statistics 412 can indicate that the "Technology Risk" has inherently high risk. Additionally, the user interface 400 may indicate that the "Technology Risk" has a medium amount of residual risk value 406, which is higher than the acceptable risk level 404. Compared to the previous residual risk value 408, the residual risk value 406 has only progressed 72% to the risk progress value 72%. Therefore, the network system 100 may implement additional risk controls 112 to reduce riskiness of the "Technology Risk" by 28% in order to meet the acceptable risk level 404. In some examples, the user interface 400 may additionally include histograms displaying various risk factors 110 and their risk assessments 120, such as their associated inherent risk values 122, residual risk values 124, risk progress values 126, or changes in residual risk 128.

FIG. 5 is another example of a user interface 500 used for displaying risk assessments 120 for a network system 100 according to one aspect of the present disclosure. The user interface 500 can include a range plot section 502, a pie chart section 506, a risk reduction section 510, and a prioritized residual risk section 514. The range plot section 502 can include a range plot 504 with a shading gradient. The left end of the range plot 504 can indicate a high amount of risk, with the leftmost end representing a score of 100. The right end of the range plot 504 can indicate a low amount of risk, with the rightmost end representing a score of 0. The range plot 504 can display inherent risk values, residual risk values, and acceptable risk values. In one example, the range plot 504 can display an inherent risk value of 100, a residual risk value of 86, and an acceptable risk value of 30 for a grouping 118 of risk factors 110. This can indicate that this grouping 118 of risk factors 110 is highly risky and must significantly decrease its residual risk in order to achieve a low acceptable risk value.

The pie chart section 506 can include one or more pie charts 508. The pie charts 508 can utilize various shades to display various risk analysis metrics to a user. A pie chart displaying 100% can represent a risk factor 110 that is at or within the acceptable risk value. In the same example, the pie chart section 506 can include a risk progress pie chart and a risk factors outside of acceptable risk levels pie chart. The risk progress pie chart can include a 20% shaded section, indicating that there has been 20% progress from a previous risk analysis to the current risk analysis towards achieving the acceptable risk level. The risk factors out of acceptable risk levels pie chart can show that 5 risk factors have residual risk value that is higher than the desired acceptable risk level. The risk factors outside of acceptable risk levels pie chart can include a 50% shaded section indicating risk factors that are within the acceptable risk level, a 30% alternatively shaded section indicating risk factors that are close to meeting the acceptable risk level, a 10% alternatively shaded section indicating risk factors that are far from meeting the acceptable risk level, and a 10% alternatively shaded section indicating risk factors that are very far from meeting the acceptable risk level. This can indicate that there is still a significant amount of risk progress that can be achieved, and that half of the risk factors are still outside of acceptable risk levels.

The risk reduction section 510 can include one or more squares 512 with a number from 0-100 indicating an ability to reduce risk. The shading of the squares can correspond with the number indicating an ability to reduce risk. In this example, a higher score represents a stronger ability to reduce risk and a lower score represents a weaker ability to reduce risk. The squares 512 can show various metrics from the risk assessment 120 related to reducing risk for a particular risk factor 110. In this example, the risk reduction section 510 can include four squares 512: an average control strength square (representing an average risk control value) with a value of 82 and the descriptor "effective", an ability to reduce risk square (representing the risk control value) with a value of 10 and the descriptor "ineffective", a likelihood reduction square with a value of 68 and the descriptor "partially effective", and an impact square with a value of 1 and the descriptor "ineffective." These values can indicate that the network system 100 should enhance its detective capabilities to reduce risk for the particular risk factor 110.

The prioritized residual risk section 514 can include a list of risk factors 110 and their residual risk values, ordered from highest residual risk to lowest residual risk. In this example, the "Information/Cyber Security" risk factor 110 can have the highest residual risk value of 83. This can indicate that focusing on reducing risk to the Information/Cyber Security risk factor 110 as well as the other listed risk factors may be beneficial for reducing overall risk to the network system 100.

Figure 6:
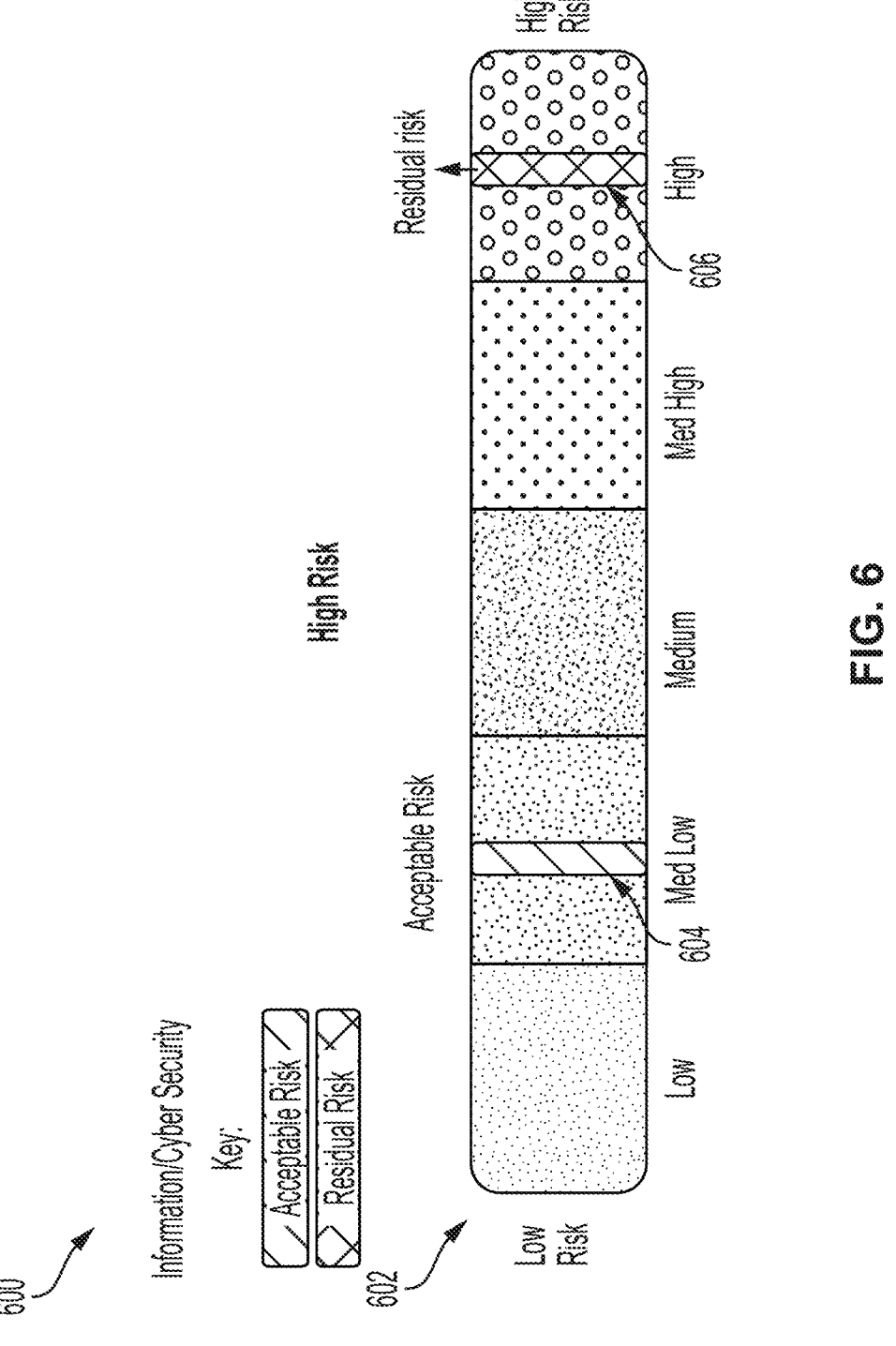
FIG. 6 is another example of a user interface used for displaying risk assessments for a network system according to one aspect of the present disclosure.

FIG. 6 is another example of a user interface 600 used for displaying risk assessments 120 for a network system 100 according to one aspect of the present disclosure. The user interface 600 can include a range plot 602 with categories indicating a level of risk. For example, the range plot 602 can include a low risk category, a medium low risk category, a medium risk category, a medium high risk category, and a high risk category. In the example depicted in FIG. 6, the range plot 602 can depict an acceptable risk value and a residual risk value for a grouping 118 that includes information security and cyber security risk factors 110. The range plot 602 can display a "medium-low" amount of acceptable risk 604 and a "high" amount of residual risk 606. This can indicate that this grouping 118 of risk factors 110 is highly risky and must significantly decrease its residual risk 606 in order to achieve a low acceptable risk value 604.

In some examples, lowering the residual risk value 124 to achieve a low acceptable risk value can be accomplished by analyzing control coverage values of risk controls 112. Turning now to FIG. 7, a flowchart of a process for determining prioritization of risk controls 112 for a network system 100 according to one aspect of the present disclosure is depicted. In some examples, the processor 204 can implement some or all of the steps shown in FIG. 3. Other examples may involve more steps, fewer steps, different steps, or a different order of the steps than is shown in FIG. 7. The steps of FIG. 7 are described below with reference to components described above with regard to FIGS. 1-6.

At block 702, the processor 204 can determine a hierarchy of groupings 114 for risk factors 110 within a network system 100 based on risk data 108 associated with the risk factors 110. The processor 204 may receive the risk data 108 from one or more user devices 106*a-c*. The risk data 108 can include risk data for one or more types of risk factors 110*a-b* for an organization that includes the one or more user devices 106*a-c*. The processor 204 may determine which risk data 108 is associated with which risks factor 110. The processor 204 may determine a hierarchy of groupings 114 for the risk factors 110, as some risk factors 110 may be general categories that can include more specific and lower level risk factors 110.

At block 704, the processor 204 can determine associations between the risk data 108 and the risk controls 112. For example, each risk factor 110 can be associated with one or more risk controls 112. The risk controls 112 can represent an amount of control for reducing riskiness of the risk factor 110. The processor 204 can determine associations between the risk data 108 and the risk controls 112 based on the association between the risk data 108 and the risk factors 110.

At block 706, the processor 204 can determine a risk assessment 120 for a risk factor 110 based on the risk data 108, the risk controls 112, and the hierarchy of groupings 114. The risk assessment 120 can include determining an inherent risk value 122 for the risk factor 110 based on the risk data 108. The inherent risk value 122 can be a measure of the riskiness of the risk factor 110 without any control measures applied. The risk assessment 120 can also include a residual risk value 124. The residual risk value 124 can be the amount of risk for the risk factor 110 after the associated risk controls 112 are applied to the risk data 108.

At block 708, the processor 204 can further determine the risk assessment 120 by determining a control coverage based on the associations and the risk data 108. For example, the control coverage can be an amount of inherent risk value 122 that is covered by the risk controls 112 associated with the risk factor 110. A low control coverage may result in a high residual risk value 124 that is higher than a predetermined acceptable risk level. Therefore, the processor 204 can identify one or more risk controls out of the group of risk controls 112 to be prioritized for reduction of the residual risk value 124. The prioritized risk controls can be determined based on their individual control strength values or based on whether an improvement plan for increasing the control strength value is already being implemented. The processor 204 can generate a recommendation for increasing the control strength values for the prioritized risk controls as part of the risk assessment 120. Additionally or alternatively, the processor 204 can generate a recommendation to increase the number of risk controls 112 associated with the risk factor 110. The risk assessment 120 can therefore include the control coverage values and the recommendation. At block 708, the processor 204 can output the risk assessment 120 for each grouping 118 for display on a graphical user interface, such as on the user interface 400 depicted in FIG. 4, the user interface 500 depicted in FIG. 5, or the graphical user interface 600 depicted in FIG. 6.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable memory comprising instructions that are executable by the processor for causing the processor to:
    determine a hierarchy of groupings for a plurality of risk factors within a network based on risk data of a plurality of risk data associated with each of the plurality of risk factors, a risk factor of the plurality of risk factors being a network security risk factor, and the hierarchy of groupings comprising a first grouping and a second grouping, the first grouping comprising a first subset of the plurality of risk factors, and the second grouping comprising the first subset of the plurality of risk factors and a second subset of the plurality of risk factors;
    subsequent to determining the hierarchy of groupings of for the plurality of risk factors:
    determine, for each risk factor of the plurality of risk factors, a risk control of a plurality of risk controls based on the risk control reducing an amount of risk associated with the risk factor, wherein the risk control for the network security risk factor is a two-factor authentication requirement that is not implemented in the network;
    determine, for each risk control of the plurality of risk controls, a risk control value between 0 and 1 that represents an amount of risk reduction associated with the risk control of the plurality of risk controls;
    generate a risk assessment for each risk factor of the plurality of risk factors based on the plurality of risk data and the plurality of risk controls, wherein generating the risk assessment for each risk factor of the plurality of risk factors comprises, for each risk factor:
        generating, using the risk data, an inherent risk value, the inherent risk value representing a level of risk associated with the risk factor when the risk control is not implemented;
        generating, using the risk data and the risk control value for the risk control, a residual risk value representing a level of risk associated with the risk factor when the risk control is implemented;
    determine, based on the risk assessment for each of the plurality of risk factors, a cumulative control coverage for the plurality of risk factors, the cumulative control coverage comprising a control strength value indicating a proportion of an overall inherent risk score for the plurality of risk factors that is covered by one or more risk controls of the plurality of risk controls that are implemented in the network, wherein the overall inherent risk score is an accumulation of the inherent risk value for each risk factor of the plurality of risk factors;
    output the risk assessment for each risk factor of the plurality of risk factors for display on a graphical user interface, the graphical user interface comprising a range plot comprising a first indicator representing the overall inherent risk score and a second indicator representing an overall residual risk score, wherein the overall residual risk score is an accumulation of the residual risk value for each risk factor of the plurality of risk factors;
    compare the control strength value to a predetermined threshold; and
    cause, based on the control strength value being below a predetermined threshold, implementation of an additional risk control in the network for the network security risk factor by implementing the two-factor authentication requirement in the network, wherein implementing the two-factor authentication requirement in the network increases the control strength value for the plurality of risk factors in the network.

2. The system of claim 1, wherein the instructions are further executable by the processor for causing the processor to:
    identify, based on the cumulative control coverage, a subset of the plurality of risk controls that are not implemented in the network to prioritize to increase the control strength value.

3. The system of claim 2, wherein the instructions are further executable by the processor for causing the processor to identify the subset of the plurality of risk controls to prioritize by:
    identifying the subset of the plurality of risk controls that are not associated with an improvement plan.

4. The system of claim 1, wherein the instructions are further executable by the processor for causing the processor to:
    generate a recommendation to increase the control strength value.

5. The system of claim 1, wherein the instructions are further executable by the processor for causing the processor to generate the risk assessment for each of the plurality of risk factors by:
    determining a risk progress value by comparing the residual risk value for each of the plurality of risk factors with a predetermined acceptable risk level.

6. The system of claim 5, wherein the instructions are further executable by the processor for causing the processor to output the risk assessment for each risk factor of the plurality of risk factors by:
    displaying, on the graphical user interface, the inherent risk value, the residual risk value, and the predetermined acceptable risk level for the first subset of the plurality of risk factors associated with the first grouping of the hierarchy of groupings on a range diagram; and
    displaying, on the graphical user interface, a ranking of the hierarchy of groupings according to the residual risk value for each of the plurality of risk factors in each grouping of the hierarchy of groupings.

7. A method comprising:
determining a hierarchy of groupings for a plurality of risk factors within a network based on risk data of a plurality of risk data associated with each of the plurality of risk factors, a risk factor of the plurality of risk factors being a network security risk factor, and the hierarchy of groupings comprising a first grouping and a second grouping, the first grouping comprising a first subset of the plurality of risk factors, and the second grouping comprising the first subset of the plurality of risk factors and a second subset of the plurality of risk factors;

subsequent to determining the hierarchy of groupings for the plurality of risk factors:

determining, for each risk factor of the plurality of risk factors, a risk control of a plurality of risk controls based on the risk control reducing an amount of risk associated with the risk factor, wherein the risk control for the network security risk factor is a two-factor authentication requirement that is not implemented in the network;

determining, for each risk control of the plurality of risk controls, a risk control value between 0 and 1 that represents an amount of risk reduction associated with the risk control of the plurality of risk controls;

generating a risk assessment for each of the plurality of risk factors based on the plurality of risk data and the plurality of risk controls, wherein generating the risk assessment for each of risk factor the plurality of risk factors comprises, for each risk factor:

generating, using the risk data, an inherent risk value, the inherent risk value representing a level of risk associated with the risk factor when the risk control is not implemented;

generating, using the risk data and the risk control value for the risk control, a residual risk value representing a level of risk associated with the risk factor when the risk control is implemented;

determining, based on the risk assessment for each of the plurality of risk factors, a cumulative control coverage for the plurality of risk factors, the cumulative control coverage comprising a control strength value indicating a proportion of an overall inherent risk score for the plurality of risk factors that is covered by one or more risk controls of the plurality of risk controls that are implemented in the network, wherein the overall inherent risk score is an accumulation of the inherent risk value for each risk factor of the plurality of risk factors;

outputting the risk assessment for each risk factor of the plurality of risk factors for display on a graphical user interface, the graphical user interface comprising a range plot comprising a first indicator representing the overall inherent risk score and a second indicator representing an overall residual risk score, wherein the overall residual risk score is an accumulation of the residual risk value for each risk factor of the plurality of risk factors;

comparing the control strength value to a predetermined threshold; and causing, based on the control strength value being below a predetermined threshold, implementation of an additional risk control in the network for the network security risk factor by implementing the two-factor authentication requirement in the network, wherein implementing the two-factor authentication requirement in the network increases the control strength value for the plurality of risk factors in the network.

8. The method of claim 7, wherein the method further comprises:

identify, based on the cumulative control coverage, a subset of the plurality of risk controls that are not implemented in the network to prioritize to increase the control strength value.

9. The method of claim 8, wherein the method further comprises identifying the subset of the plurality of risk controls to prioritize by:

identifying the subset of the plurality of risk controls that are not associated with an improvement plan.

10. The method of claim 7, wherein the method further comprises generating a recommendation to increase the control strength value.

11. The method of claim 7, wherein the method further comprises generating the risk assessment for each of the plurality of risk factors by:

determining a risk progress value by comparing the residual risk value for each of the plurality of risk factors with a predetermined acceptable risk level.

12. The method of claim 11, wherein the method further comprises outputting the risk assessment for each risk factor of the plurality of risk factors by:

displaying, on the graphical user interface, the inherent risk value, the residual risk value, and the predetermined acceptable risk level for the first subset of the plurality of risk factors associated with the first grouping of the hierarchy of groupings on a range diagram; and displaying, on the graphical user interface, a ranking of the hierarchy of groupings according to the residual risk value for each of the plurality of risk factors in each grouping of the hierarchy of groupings.

13. A non-transitory computer-readable medium comprising program code that is executable by a processor for causing the processor to:

determine a hierarchy of groupings for a plurality of risk factors within a network based on risk data of a plurality of risk data associated with each of the plurality of risk factors, a risk factor of the plurality of risk factors being a network security risk factor, and the hierarchy of groupings comprising a first grouping and a second grouping, the first grouping comprising a first subset of the plurality of risk factors, and the second grouping comprising the first subset of the plurality of risk factors and a second subset of the plurality of risk factors;

subsequent to determining the hierarchy of groupings for the plurality of risk factors:

determine, for each risk factor of the plurality of risk factors, a risk control of a plurality of risk controls based on the risk control reducing an amount of risk associated with the risk factor, wherein the risk control for the network security risk factor is a two-factor authentication requirement that is not implemented in the network;

determine, for each risk control of the plurality of risk controls, a risk control value between 0 and 1 that represents an amount of risk reduction associated with the risk control of the plurality of risk controls;

generate a risk assessment for each of the plurality of risk factors based on the plurality of risk data and the plurality of risk controls, wherein generating the risk assessment for each risk factor of the plurality of risk factors comprises, for each risk factor:

generating, using the risk data, an inherent risk value, the inherent risk value representing a level of risk associated with the risk factor when the risk control is not implemented;

generating, using the risk data and the risk control value for the risk control, a residual risk value representing a level of risk associated with the risk factor when the risk control is implemented;

determine, based on the risk assessment for each of the plurality of risk factors, a cumulative control coverage for the plurality of risk factors, the cumulative control coverage comprising a control strength value indicating a proportion of an overall inherent risk score for the plurality of risk factors that is covered by one or more risk controls of the plurality of risk controls that are implemented in the network, wherein the overall inherent risk score is an accumulation of the inherent risk value for each risk factor of the plurality of risk factors;

output the risk assessment for each risk factor of the plurality of risk factors for display on a graphical user interface, the graphical user interface comprising a range plot comprising a first indicator representing the overall inherent risk score and a second indicator representing an overall residual risk score, wherein the overall residual risk score is an accumulation of the residual risk value for each risk factor of the plurality of risk factors;

compare the control strength value to a predetermined threshold; and cause, based on the control strength value being below a predetermined threshold, implementation of an additional risk control in the network for the network security risk factor by implementing the two-factor authentication requirement in the network, wherein implementing the two-factor authentication requirement in the network increases the control strength value for the plurality of risk factors in the network.

14. The non-transitory computer-readable medium of claim 13, wherein the program code is further executable by the processor for causing the processor to:

identify, based on the cumulative control coverage, a subset of the plurality of risk controls that are not implemented in the network to prioritize to increase the control strength value.

15. The non-transitory computer-readable medium of claim 14, wherein the program code is further executable by the processor for causing the processor to identify the subset of the plurality of risk controls to prioritize by:

identifying the subset of the plurality of risk controls that are not associated with an improvement plan.

16. The non-transitory computer-readable medium of claim 13, wherein the program code is further executable by the processor for causing the processor to:

generate a recommendation to increase control strength value.

17. The non-transitory computer-readable medium of claim 13, wherein the program code is further executable by the processor for causing the processor to generate the risk assessment for each of the plurality of risk factors by:

determining a risk progress value by comparing the residual risk value for each of the plurality of risk factors with a predetermined acceptable risk level.

\* \* \* \* \*